(12) United States Patent
Benziger et al.

(10) Patent No.: US 7,951,501 B2
(45) Date of Patent: May 31, 2011

(54) FUEL CELL SYSTEM AND METHOD FOR CONTROLLING CURRENT

(75) Inventors: Jay B Benziger, Lawrenceville, NJ (US); Claire H. Woo, Berkeley, CA (US)

(73) Assignee: The Trustees of Princeton University, Princeton, NJ (US)

( * ) Notice: Subject to any disclaimer, the term of this patent is extended or adjusted under 35 U.S.C. 154(b) by 795 days.

(21) Appl. No.: 11/840,710

(22) Filed: Aug. 17, 2007

(65) Prior Publication Data

US 2008/0044693 A1    Feb. 21, 2008

Related U.S. Application Data

(60) Provisional application No. 60/838,354, filed on Aug. 17, 2006.

(51) Int. Cl.
*H01M 8/04*  (2006.01)

(52) U.S. Cl. ........ 429/450; 429/451; 429/479; 429/512; 429/515; 429/428; 429/430; 429/415; 429/408; 429/400

(58) Field of Classification Search .................... 429/32, 429/34, 38, 39, 450, 451, 512, 515, 479, 429/428, 430, 415, 408, 400
See application file for complete search history.

(56) References Cited

U.S. PATENT DOCUMENTS

| | | | |
|---|---|---|---|
| 4,743,518 A | 5/1988 | Romanowski | |
| 4,769,297 A | 9/1988 | Reiser et al. | |
| 4,876,115 A | 10/1989 | Raistrick | |
| 5,646,852 A | 7/1997 | Lorenz et al. | |
| 5,771,476 A | 6/1998 | Mufford et al. | |
| 6,245,453 B1 | 6/2001 | Iwase et al. | |
| 6,296,963 B1 | 10/2001 | Nanjo | |
| 6,638,653 B2 | 10/2003 | Andou et al. | |
| 6,864,010 B1 | 3/2005 | McLean | |
| 6,911,276 B2 | 6/2005 | Extrand | |
| 6,926,980 B2 | 8/2005 | Kato et al. | |
| 7,008,718 B2 | 3/2006 | Kubota et al. | |
| 7,022,430 B2 | 4/2006 | Enjoji et al. | |
| 7,037,616 B2 | 5/2006 | Nomura et al. | |
| 7,097,931 B2 | 8/2006 | Abdou et al. | |

(Continued)

OTHER PUBLICATIONS

Benziger et al, *The Stirred Tank Reactor Polymer Electrolyte Membrane Fuel Cell*, Aug. 2004, vol. 50, No. 8., Published online in Wiley InterScience (www.interscience.wiley.com), pp. 1889-1900.

(Continued)

*Primary Examiner* — Bruce F Bell
(74) *Attorney, Agent, or Firm* — Stephen H. Eland; Dann, Dorfman, Herrell & Skillman

(57) ABSTRACT

A fuel cell is provided, which includes a first plenum around an anode for receiving fuel, and a second plenum around a cathode for receiving oxygen. A fluid controller controls the supply of fuel to the first plenum or oxygen to the second plenum. A sensor detects the load on the fuel cell, and a controller controls the fluid controller in response to the load detected by the sensor.
A method for controlling the output of a fuel cell is also provided, which includes the step of providing a fuel cell having a reaction area with an effective area where reactions may occur. The demand on the fuel cell is detected and the effective area of the reaction area is varied in response to the demand. Alternatively, the fuel cell may have an internal resistance, and the method may include varying the internal resistance in response to the demand.

27 Claims, 9 Drawing Sheets

U.S. PATENT DOCUMENTS

| | | | |
|---|---|---|---|
| 7,138,200 | B1 | 11/2006 | Iwase et al. |
| 7,163,760 | B2 | 1/2007 | Tanaka et al. |
| 7,195,831 | B2 * | 3/2007 | Sano et al. .................. 429/22 |
| 2003/0162075 | A1 | 8/2003 | Gorbell |
| 2004/0001982 | A1 * | 1/2004 | Reiser et al. .................. 429/13 |
| 2004/0115514 | A1 | 6/2004 | Iwase et al. |
| 2005/0084725 | A1 | 4/2005 | Arthur et al. |
| 2005/0244703 | A1 | 11/2005 | Osenar et al. |
| 2006/0093891 | A1 | 5/2006 | Issacci et al. |
| 2006/0134504 | A1 | 6/2006 | Laurent |
| 2006/0172175 | A1 | 8/2006 | Otawa et al. |
| 2007/0059582 | A1 | 3/2007 | Leonida |
| 2007/0059583 | A1 | 3/2007 | Vinsant |

OTHER PUBLICATIONS

Correa et al, *An electrochemical-Based Fuel Cell Model Suitable for Electrical Engineering Automation Approach*, Oct. 2004, 51(5), Ieee Transactions on Industrial Electronics, 18 pages.

Hogarth et al, *Channel-less Self Draining Auto-humidified Fuel Cell Operating under Dry Feeds*, Jul. 19, 2005, Journal of Power Sources, 33 pages.

Hogarth et al, *Dynamics of Autohumidified PEM Fuel Cell Operation*, Sep. 15, 2006, 153 (11), Journal of Electrochemical Society, pp. 2139-2146.

Hogarth et al, *High Performance Dry Feed Hydrogen PEMFCs: Understanding the Water Balance as a Design Tool for Novel Polymer Membranes*, 2005, 50 (2), Prepr. Pap.-Am. Chen. Soc., Div. Fuel Chem., 2 pages.

Hogarth et al, *Operation of Polymer Electrolyte Membrance Fuel Cells with Dry Feeds: Design and Operating Strategies*, 2006, 159 Journal of Power Sources, pp. 968-978.

Grujicic et al, *Model-based Control Strategies in the Dynamic Interaction of Air Supply and Fuel Cell*, vol. 218, Proc. Instn. Mech. Engrs., 15 pages.

Suh et al, *Coordination of Converter and Fuel Cell Controllers*, 2005, 29, Int. J. Energy Res., pp. 1167-1189.

Woo et al, *PEM Fuel Cell Current Regulation by Fuel Feed Control*, 2007, 62, Chemical Engineering Science, pp. 957-968.

Zawodzinski e al, *Efficient Fuel Cell Systems*, Jun. 7-8, 2000 DOE OTT Fuel Cells program Review, 20 pages.

* cited by examiner

FUEL CELL SYSTEM AND METHOD FOR CONTROLLING CURRENT

PRIORITY APPLICATION

The present application claims priority to U.S. Provisional Application No. 60/838,354 filed Aug. 17, 2006, which is hereby incorporated herein by reference.

BACKGROUND

Fuel cells offer the promise of providing a portable power source with little or no greenhouse emissions. Unfortunately, fuel cell developers face numerous barriers that have delayed the widespread commercialization of fuel cells.

One of the commercialization barriers is the management of water content in a fuel cell. To operate properly, the membrane of a fuel cell must be properly hydrated, which favors high water content in the fuel cell. On the other hand, excess water in the fuel cell limits the mass flow of the fuel through the fuel cell, thereby inhibiting operation of the fuel cell. Specifically, excess water in the fuel cell block pores in the gas diffusion layer. The fuel, such as hydrogen, is unable to pass through the blocked pores to react with the catalyst to start the reaction that drives the fuel cell. In this way, the blocked pores reduce the effective area of the fuel cell.

Several techniques have been promoted to address the fluid balance in a fuel cell. Under a common approach, excess gas is fed to the fuel cell. The excess gas is introduced at sufficient pressure to force the excess water out of the fuel cell to limit the amount of water that may block the hydrogen from exposure to reaction sites. However, the high flow rate will tend to dry out the membrane. Therefore, the hydrogen and oxygen supplied to the fuel cell is typically humidified. Additionally, the excess gas used to force out the water is either wasted, or it must be recovered and recycled. The need to humidify the feeds and recover the excess gases increases the complexity and cost of the fuel cell.

Another barrier faced by developers is the need to efficiently vary the power produced by a fuel cell. The fuel cell is used to power a load, such as a motor or other device. As the power requirements for the load vary, the power that the fuel cell provides to the load should also vary.

A simple and common means of controlling the power to the load is to vary the effective load resistance seen by the fuel cell by adding a shunt resistor. However, this simply wastes the excess power created by the fuel cell by dissipating the excess power. The result is reduced fuel efficiency.

Control of a fuel cell would be greatly simplified if one could manipulate the power output simply by controlling the feeds to the fuel cell, similar to the way in which the power produced by an internal combustion engine is controlled by controlling the amount of gas fed to the engine. However, experience has shown that limiting the flow of feeds to the fuel cell has led to the buildup of water, thereby causing large internal voltage drops.

SUMMARY OF THE INVENTION

In light of the foregoing, the present invention provides a fuel cell having characteristics that permit controlling the output of the fuel cell. According to one aspect, a fuel cell is provided, which has an anode, and cathode and an electrolyte disposed between the anode and the cathode. A first plenum formed adjacent the anode comprises a first inlet for receiving a supply of a first reaction fluid. A second plenum formed adjacent the cathode comprises a second inlet for receiving a supply of a second reaction fluid. A sensor is provided for detecting the demand of a load connected with the fuel cell. A controller controls the supply of at least one of the reaction gases to the fuel cell in response to the detected demand. In one embodiment, a water reservoir is connected with the fuel cell to allow water to flow between at least one of the plenums and the fluid reservoir.

According to another aspect, a fuel cell is provided which has an anode, a cathode and a proton exchange membrane disposed between the anode and the cathode. A self-draining first fluid plenum is formed adjacent the anode and a self-draining second fluid plenum is formed adjacent the cathode. A fuel supply is connected with the first plenum and an oxygen supply is connected with the second plenum. A controller is operable to control the fluid flow of the fuel in response to the desired output determined for the fuel cell. A fluid reservoir may be connected with the fuel cell to allow water to flow between the reservoir and one of the plenums.

According to yet another aspect, a method for controlling the output of a fuel cell is provided. The method includes the step of providing a fuel cell having a reaction area. The method further includes the step of detecting the demand required for the fuel cell and varying the effective area of the reaction area in response to the detection of the demand. The step of varying the reaction area may comprise the step of variably covering portions of a catalyst dispersed in the reaction area with water to impede migration of a reactant fuel to the catalyst. Additionally, the step of varying the reaction area may include the step of controlling the flow of water between a reservoir and the fuel cell.

The present invention further provides a method for controlling the output of a fuel cell by varying the internal resistance of the fuel cell. According to this aspect, the method comprises the step of providing a fuel cell having an internal resistance. The desired output for the fuel cell is determined in response to a changing variable, such as the demand of a load connected with the fuel cell. The method includes the step of varying the internal resistance of the fuel cell in response to the determined output for the fuel cell. The step of varying the internal resistance may comprise controlling the flow of a fluid flowing to the fuel cell.

DETAILED DESCRIPTION

Figure 1:
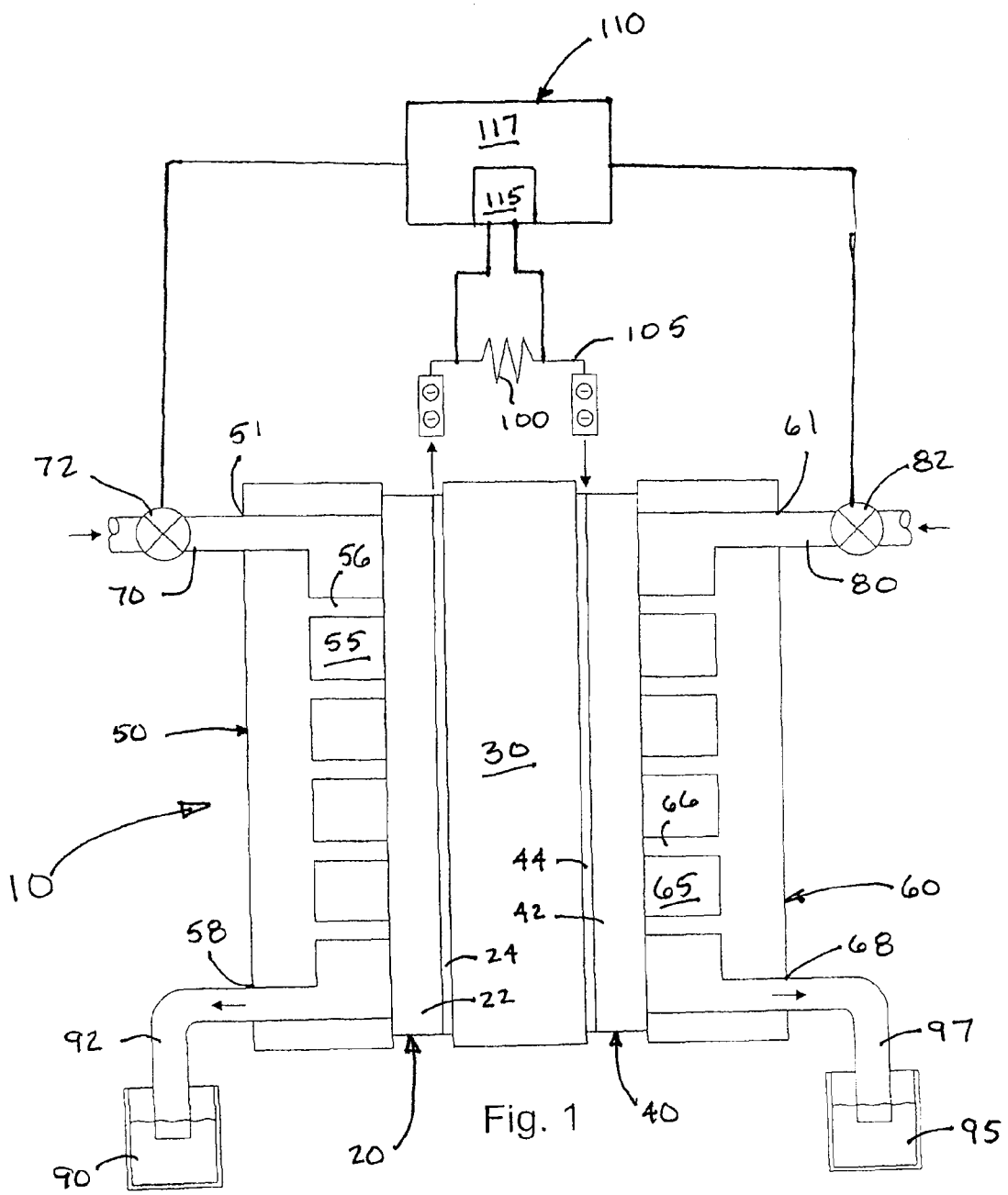
FIG. 1 is a diagrammatic cross-sectional view of a fuel cell system.
Figure 2:
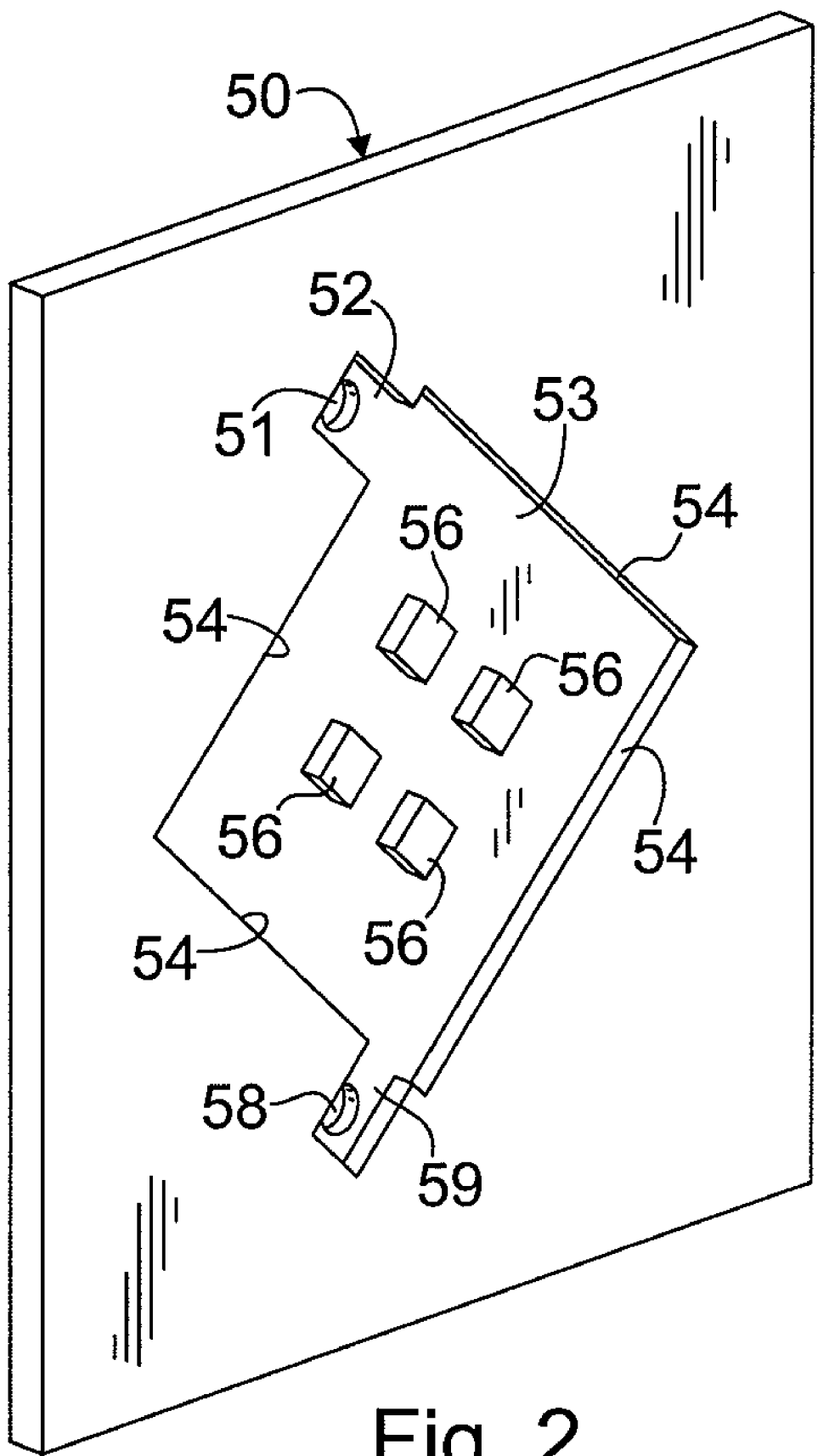
FIG. 2 is a perspective view of a flow control plate of the fuel cell in FIG. 1.

Referring now to FIGS. 1-2, a fuel cell is designated generally 10. The fuel cell includes an anode 20 and a cathode 40. An electrolyte 30 is disposed between the anode and the cathode. An electrical load 100, such as a motor or otherwise is connected to the anode 20 and cathode 40 to provide an electrical path between the anode and the cathode.

A fuel supply 70 flows to the anode 20, and a supply of oxygen 80 flows to the cathode 40. The fuel cell may be any of a variety of types of fuel cells. In the present instance, the fuel cell is a membrane fuel cell, such as a proton exchange membrane or PEM fuel cell. Although a variety of fluids can be used for a fuel, in the present instance, hydrogen is used as a fuel. Either oxygen or air can be used as a source of oxygen.

The anode 20 comprises a catalyst 24 adjacent the membrane 30. The catalyst 22 facilitates the dissociation of the fuel. For instance an application in which the fuel is hydrogen, the catalyst facilitates the dissociation of hydrogen into hydrogen ions and electrons. Specifically, the catalyst facilitates the dissociation of $H_2$ into $2H^+$ and $2 e^-$. The anode includes a gas diffusion layer 22 that diffuse the fuel as the fuel migrates toward the catalyst. In the present instance, the gas diffusion layer 22 is carbon and the catalyst is a layer of platinum dispersed on the carbon.

The flow of fuel to the anode 20 is controlled by a field flow plate 50. The field flow plate 50 abuts the anode to form a fluid plenum between the anode 20 and a wall of the field flow plate. Referring to FIG. 2, the field flow plate includes a recess 53 formed in the wall of the plate. The recess 53 is approximately half the thickness of the plate and is a generally open recess. Specifically, the recess 53 includes outer walls 55 that define the recess, but there are no walls within the recess to define a separate channel or path within the recess. Instead, the configuration of the recess 53 allows generally free flow of fluid within the plenum without significant flow restriction between the walls 55 of the recess.

An inlet 51 is located at the top end of the recess 53. The inlet 51 is a hole through the thickness of the plate. A channel 52 is formed between the inlet 51 and the recess 53 to provide a flow path from the inlet to the recess 53. The channel 52 is formed at a downwardly sloping angle so that liquid formed in the channel will readily flow downwardly into the recess 53 under the force of gravity. An outlet 58 is formed below the bottom of the recess 53. The outlet is a hole through the thickness of the plate, similar to the inlet 51. An outlet channel 59 similar to the inlet channel 52 is formed between the recess and the outlet to provide a flow path between the recess and the outlet. The outlet channel 59 is formed at a downwardly sloping angle so that liquid formed in the outlet channel will readily flow downwardly toward the outlet 58 under the force of gravity.

As described above, the recess in the fluid flow plate is configured to provide a generally open recess without significant restriction on fluid flow within the recess. However, as shown in FIG. 1, it is desirable to include a plurality of posts or pillars 56 66 that project upwardly from the base of the recess. Any number of pillars can be included. In the embodiment in FIG. 2, four pillars project upwardly from the recess. In FIG. 1, the flow plate is illustrated with more pillars, which are smaller in diameter than the pillars illustrated in FIG. 2. Additionally, as can be seen best in FIG. 2, in the present instance, the pillars are formed to that the edges of the pillars angle downwardly toward the lower portion of the recess. In this way, fluid that forms above the pillars or on the pillars will tend to flow over the pillars and down toward the channel 59 adjacent the outlet 58.

The field flow plate 50 is position over the anode 20 so that the recess 53 in the plate forms a plenum 54 between the anode and the field flow plate. The pillars 56 extend into engagement with the gas diffusion layer 22 of the anode.

The field flow plates may be formed from any of a variety of materials, such as metal. However, in the present instance, the field flow plate 50 is formed from graphite and the pillars 56 are integrally formed in the graphite plate.

The cathode 40 is formed substantially similarly to the anode 20. Specifically, the cathode 40 comprises a catalyst 44, such as a layer of platinum dispersed on a gas diffusion later 42, such as carbon. Similarly, a second field flow plate 60 is provided, which is substantially similar to the field flow plate 50 positioned over the anode 20. The second field flow plate has an inlet 61 and an outlet 68, with a recess shaped substantially similarly to the recess in the first field flow plate. The second plate also includes an inlet channel connecting the inlet 61 with the recess and an outlet recess connecting the recess with the out 68. Although the second plate is configured substantially similarly to the first plate, the recess and inlet and outlet channels are formed in the second plate as a mirror image of the recess 53 and channels 52, 59 of the first plate. In this way, the second field flow plate is configured to form a second plenum 65 designed to receive the supply of oxygen.

The catalyst 42 in the cathode is selected to facilitate the combination of the oxygen with the hydrogen ions and electrons from the fuel. In the present instance, the catalyst in the cathode is platinum.

The electrolyte 30 is sandwiched between the anode 20 and the cathode 40. As mentioned above, in the present instance, the electrolyte 30 is a membrane. The membrane is selected to be a material that conducts protons. Additionally, the membrane is selected to be a material that is insulative to prevent the transfer of electrons through the membrane. In this way, the hydrogen ions diffuse through the membrane from the anode 20 to the cathode 40 while the hydrogen electrons pass though a separate electric path 105 that electrically connects the anode to the cathode. An electrical element or load 100 that is driven by the fuel cell is positioned along the electrical path 105. The hydrogen ions and the electrons from the electrical path 105 combine with the oxygen at the anode to form water. Although a variety of material can be used for the membrane, in the present instance the membrane is formed of a polymer, such as NAFION produced by Dupont.

A reservoir of fluid is connected with both the anode and the cathode. In the present instance, a first reservoir 90 is in fluid communication with the plenum 55 adjacent the anode. A conduit 92 provides a flow path between the outlet of the plenum 55 and the reservoir. In the present instance, the reservoir 90 is a quantity of water and the conduit 92 is positioned so that the end of the conduit is below the surface of the water in the reservoir. In this way water can flow from the reservoir back into the anode plenum.

Similarly, a second reservoir 95 is in fluid communication with the cathode plenum 65. A second conduit 97 provides a flow path between the outlet 68 of the cathode plenum 65 and the reservoir. As with the first conduit, the second conduit 97 is positioned so that the end of the conduit is below the surface of the water in the second reservoir. In this way, water can flow from the reservoir back into the cathode plenum.

Although the system has been described as having two separate reservoirs 90, 95 for the anode and the cathode, a single reservoir may be provided. However, a barrier should be provided to prevent excess oxygen from migrating from the outlet of the cathode over to the outlet for the anode, and to prevent excess hydrogen from migrating from the outlet of the anode to the outlet for the cathode.

As discussed above, a fuel, such as hydrogen is provided to the anode via a fuel supply line 70. A fuel fluid controller 72 is provided to control the flow of hydrogen to the anode so that the amount of hydrogen can be precisely monitored and varied. In the present instance, the fluid controller 72 is a mass flow controller, such as the GFC mass flow controller produced by Aalborg Instruments & Controls, Inc. Similarly, a fluid controller 82 controls the flow of oxygen to the cathode 40. The oxygen fluid controller 82 is a mass flow controller similar to the fuel controller 72.

The fluid controllers may be controlled in a variety of ways. For instance, the fluid controllers 72, 82 may be manually controlled by the user or directly controlled based on feedback from an element in the system. In the present instance, the fluid controllers 72, 82 are controlled by a centralized controller 110 that controls both fluid controllers. The central controller 110 comprises a microprocessor 117 and a data acquisition element 115. The data acquisition element 115 is connected with an element of the system to monitor a characteristic of the operation of the system. For instance, in the configuration illustrated in FIG. 1, the data acquisition element 115 is connected with the load to monitor the demand requirements of the load. The data detected regarding the demand of the load is communicated with the microprocessor, which can then control the fluid controllers 72, 82 accordingly, as discussed below.

Configured as described above, the fuel cell 10 system operates as follows. Fuel is supplied from the supply line 70 to the cathode. Although it may be desirable to humidify the fuel, in the present instance the fuel cell is configured and controlled so that the fuel is a dry feed to the anode, and the oxygen is a dry feed to the cathode. The fuel enters the anode and diffuses through the gas diffusion layer 22 toward the catalyst 24. The catalyst facilitates the dissociation of the fuel to create hydrogen ions that diffuse through the membrane 30 toward the cathode. At the same time, the membrane 30 blocks the transfer of hydrogen electrons, so that the hydrogen electrons conduct through an electrical path connected with the cathode. Any water formed in the plenum 55 at the anode flows downwardly toward the outlet 58 and into the reservoir 90.

The conducting electrodes form a current that drives a load 100. The electrons flow toward the cathode and combine with the oxygen and the hydrogen protons at the cathode to produce water. The water formed in the cathode flows downwardly toward the outlet 58 and into the reservoir 95.

Typically, the fuel and oxygen feeds for a fuel cell are controlled so that an excess supply of fuel and oxygen are provided. The excess fluid passes through the system without being used to create electricity. Instead, the excess flow is provided to prevent the buildup of excess water. If the fuel and oxygen flows are reduced below an excess so that the system is starved, water buildup occurs and the fuel cell significantly reduces output in a generally uncontrollable manner.

In contrast, the present system can be operated so that a starvation flow of fuel can be provided to the fuel cell without detrimental effects. A starvation feed is a feed that provides a current that is less than the maximum possible current for the fuel cell. As the pressure of the fuel provided to the anode plenum is reduced, a pressure differential is created, which tends to cause fluid from the reservoir to flow into the anode plenum. This additional fluid clogs pores in the gas diffusion layer, thereby impeding the flow of fuel through the gas diffusion layer and to the catalyst. In this way, the additional water in the anode plenum increases the internal resistance of the fuel cell.

Further, under a starvation feed, the partial pressure of the fuel in the gas plenum is less than the fluid pressure in the outlet conduit 92, the fuel will remain in the gas plenum. Accordingly, the fuel does not escape, so it is not wasted.

As the fluid pressure is increased, the increased pressure of the fuel in the plenum forces some of the water out of the plenum and into the reservoir. The reduction in the water level in the plenum increases the surface area of the portion of the catalyst that is exposed to the fuel, thereby reducing the internal resistance of the fuel cell.

Despite the fact that the feeds to the anode and the cathode are dry feeds, the system retains sufficient humidity to prevent the membrane from drying. Specifically, by connecting the plenum with a water reservoir, the water vapor from the reservoir provides sufficient humidity even when the fuel and/or oxygen are fed at a reduced flow rate.

As discussed above, the flow controller 72, 82 are controllable by a controller such as a central controller 110 to control the power produced by the fuel cell. Specifically, the controller 110 may detect a characteristic of the system and use that characteristic to vary the flow rates of fuel and oxygen. In one desirable application, the controller monitors the demand of a load that is powered by the fuel cell. As the demand increases, the controller increases the flow rate of the fuel through the fuel supply line 70. This increased flow increases the partial pressure of the fuel in the anode plenum, leading to an increased power output. As the power increases to meet the demand, the controller continues to monitor the demand requirements to match the flow rate of the fuel to the demand. Conversely, as the demand reduces, the controller controls the fluid controller 72 to reduce the flow rate of the fuel being fed to the anode.

Although the controller can control the flow rate of the fuel to increase the power output, the fuel cell has a maximum current that the cell can produce. Once the maximum current is reached, additional fuel will not lead to additional power output. Instead, the increased fuel will tend to simply bubble out through the outlet, thereby wasting the additional fuel unless the system incorporates recovery elements, which are known in the art. Accordingly, it is desirable to control the flow rate of the fuel at or below the point of complete utilization of the fuel to avoid wasting the fuel.

In addition to controlling the flow rate of the fuel, the controller may control the flow rate of the oxygen as well. Specifically, the controller 110 be configured to control the fluid controller 82 to correlate the flow rate of the oxygen to the flow rate of the fuel. Specifically, the controller may control the oxygen fluid controller 82 to provide a flow of oxygen at a rate that provides a stoichiometric amount of oxygen based on the flow of fuel (e.g. hydrogen). In the present instance, it has been found desirable to control to flow of oxygen to provide a flow of oxygen in excess of the stoichiometric amount. Specifically, it has been found desirable to provide a flow of at least 10% and more desirably an excess of 30% over the stoichiometric amount of oxygen.

As described above, the flow of fuel and oxygen may be controlled by a central controller based on the desired power output for the fuel cell. In the discussion, the controller determines the appropriate fuel flow and matches the flow of oxygen to correlate to the fuel flow. Alternatively, the system may control the system by controlling the flow of oxygen.

EXAMPLES

In the following examples, use of a fuel cell similar to the fuel cell 10 described above illustrates the controllability of the fuel cell. The contact area between the gas phase and the membrane-electrode assembly (MEA) was 1.9 cm2. The anode and cathode were diamond shaped gas plenums machined from graphite with pillars to improve pressure uniformity on the MEA. The fuel cell was placed in an insulated temperature-controlled environment. The example was done with Nafion/carbon cloth MEAs. Nafion 115 membranes (ion Power Inc., DE, USA) were cleaned using a standard procedure (sequential boiling for 1 h each in 3 wt % peroxide, DI water, 1 M sulfuric acid and DI water). The Nafion was sandwiched between A6 ELAT-type electrodes (E-tek division of Denora, N.J., USA) which contained 0.5 mg/cm2 of Pt on carbon. The carbon paper was coated with 0.6 mg/cm2 of 5 wt % Nafion solution to improve contact at the three phase interface. MEAs were pressed at 140° C. for 90 s at 40 MPa pressure before being placed into the cells. Four bolts on the cell were each tightened to 3 Nm of torque.

The current and voltage across the load resistor were measured and logged by a computer. A 10-turn 0-20Ω potentiometer was manually adjusted for the desired load, which was usually kept constant at values between 0.5 and 3Ω. The voltage across the load resistor was read directly by a DAQ board. The current through the load resistor was passed through a 0.1Ω sensing resistor and the differential voltage across the sensing resistor was read by the DAQ board in order to calculate the current.

Hydrogen and oxygen were supplied from commercial cylinders (Airco) through mass flow controllers (Aalborg Instruments); the mass flow rate and voltage setpoint for the flow rate were connected to the DAQ board. Compressed air was substituted for the oxygen for experiments with air. Liquid water formed falls by gravity to the outlets of the gas plenums. The effluents drained into water reservoirs that were configured to prevent back diffusion of gases to either electrode. The water baths collected the liquid water product for both the anode and cathode in graduated cylinders.

Equation 1 below is the overall mole balance of hydrogen in the fuel cell. At steady state and 100% hydrogen utilization, no hydrogen exits the cell, so Equation 1 simplifies to Equation 2, which was used for the examples reported below. The output current of a single fuel cell connected to a fixed load resistance was controlled by varying the hydrogen feed flow rate $Q_{inA}$. Similar equations can be derived for the oxygen mole balance. A feedback control loop was set up to control the output current of the fuel cell by adjusting the feed gas flow rates.

$$\frac{V_A}{RT}\frac{dP_{H_2}^{out}}{dt} = \left(\frac{Q_A^{in}P_{H_2}^{in}}{RT} - \frac{Q_A^{out}P_{H_2}^{out}}{RT}\right) - \frac{i}{2F},\qquad \text{EQUATION 1}$$

$$\frac{i}{2F} = \frac{Q_A^{in}P_{H_2}^{in}}{RT}.\qquad \text{EQUATION 2}$$

Example 1

Figure 3:
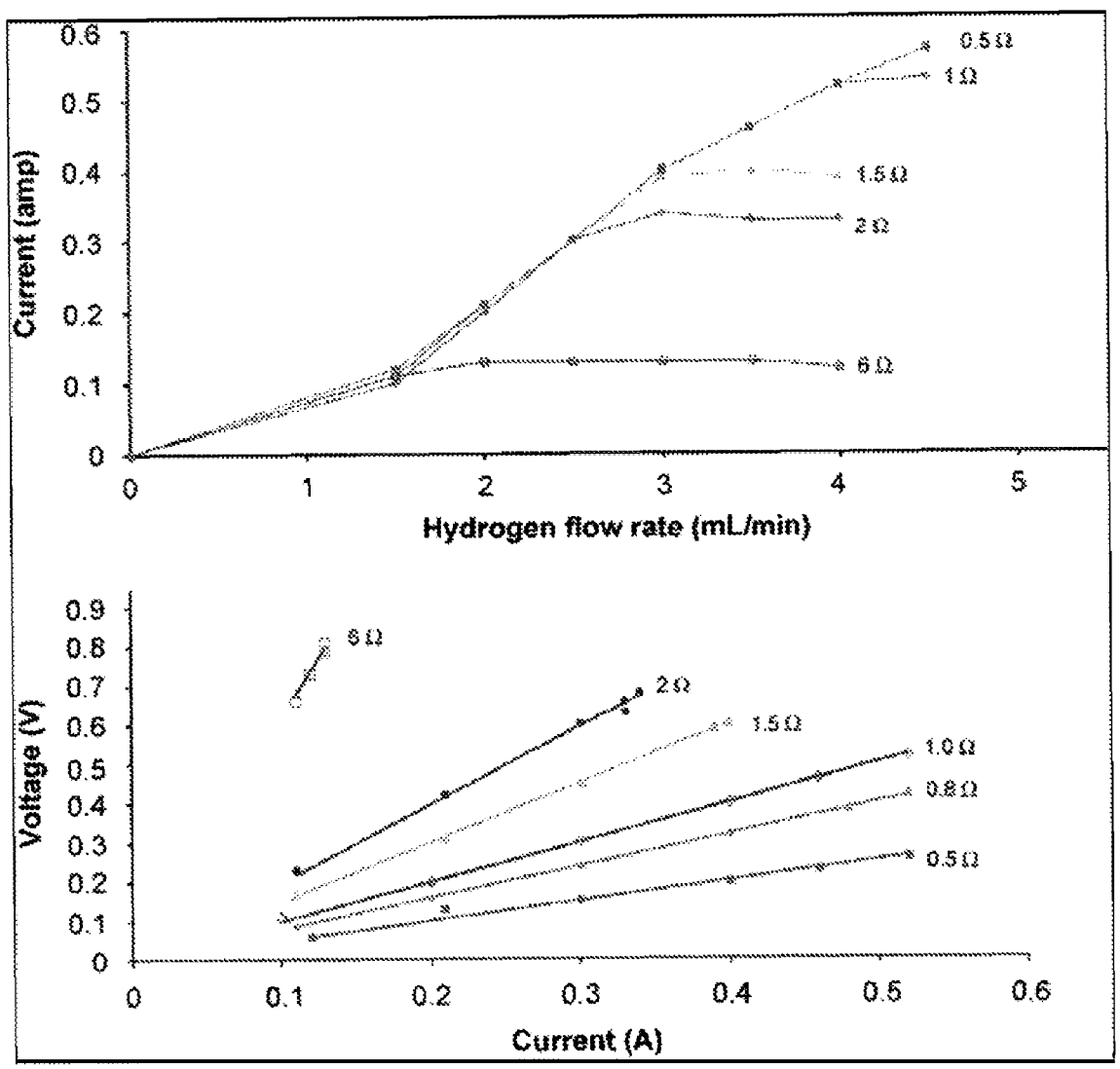
FIG. 3 provides graphical illustrations of the voltage-current and flow-current relations of the performance of the fuel cell of FIG. 1.

The results illustrate the control of the fuel cell current by fuel feed control. The self-draining fuel cell was configured to operate with dry feeds at 60° C. A potentiometer was connected as the external load and set for a fixed resistance between 0.5 and 6Ω. The $H_2/O_2$ flow rates were varied with constant stoichiometry from 1.5/0.98 to 10/6.5 mL/min. The steady-state current increased linearly with the hydrogen flow rate to a maximum current that depended on the load resistance, as shown in FIG. 3a. After the steady-state current reached its maximum value the steady-state current remained constant with any further increases in the hydrogen flow rate. At hydrogen flow rates below the maximum steady-state current no gas bubbles were seen exiting from the anode into the water reservoir. There was a stoichiometric excess of $O_2$ and gas bubbles were seen exiting from the cathode at all currents. When the hydrogen flow rate was increased above that corresponding to the maximum steady-state current, gas bubbles were observed exiting from the anode outlet into the water reservoir.

The maximum currents are summarized in Table 1 along with the hydrogen gas flow rate and the voltage drop across the load resistor. The fuel cell was operated at steady state for >24 hrs at several temperature settings between 25 and 80° C., load resistance from 0.5 to 3Ω and gas flow rates from 1.5 mL/min to the limiting current flow. The water exiting from both the anode and cathode was collected. Table 1 shows agreement in the balance between current and the water collected at the cathode at the limiting current conditions. When hydrogen utilization was 100% the water product was all collected at the cathode; the water volume in the anode reservoir remained constant. When the hydrogen flow was in excess of that corresponding to the limiting current, gas bubbles exited the anode and liquid water was collected from both the anode and cathode outlets.

TABLE 1

Limiting currents for 100% hydrogen utilization at 60° C.

| Load resis. (Ω) | Max H2 flow (sccm) | Max current (A) | ΔVmax (V) | Max power density (W/cm2) | Water collected at cathode (mL/h)/(A) |
|---|---|---|---|---|---|
| 0.5 | 6.0 | 0.810 | 0.405 | 0.173 | NA |
| 0.8 | 4.5 | 0.610 | 0.490 | 0.157 | NA |
| 1.0 | 4.0 | 0.530 | 0.530 | 0.148 | 0.38 (0.54) |
| 1.5 | 3.5 | 0.410 | 0.610 | 0.132 | 0.27 (0.40) |
| 2.0 | 2.5 | 0.345 | 0.690 | 0.125 | 0.21 (0.30) |
| 6.0 | 1.0 | 0.110 | 0.810 | 0.048 | NA |

Figure 5:
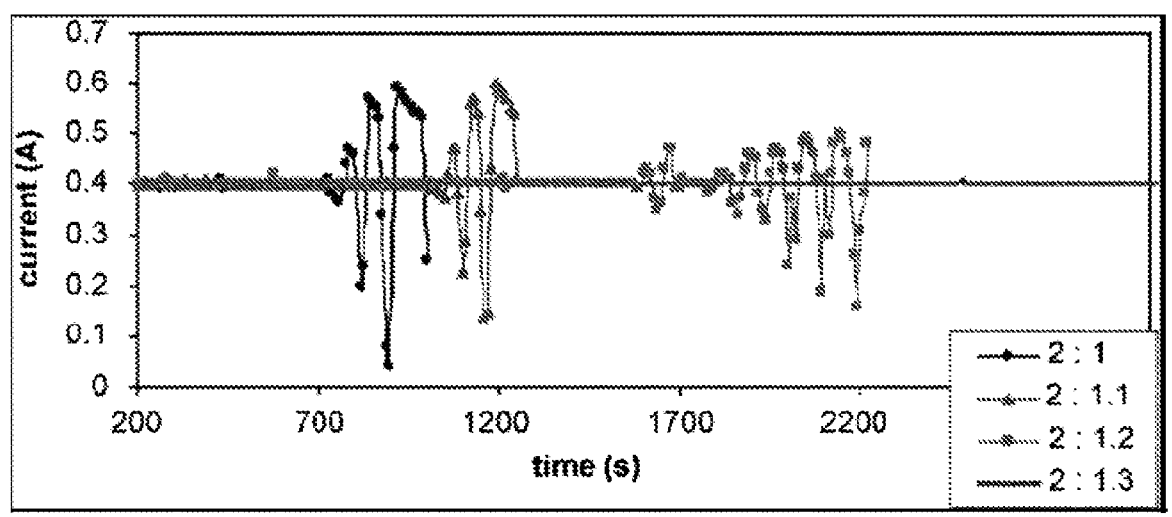
FIG. 5 is a graphical illustration of the stability of the current produced by the fuel cell of FIG. 1 under different stoichiometric proportions of oxygen.

FIG. 5 graphically summarizes the relationship between the fuel cell current, the hydrogen flow rate to the fuel cell and the voltage drop across the load resistor. The current scaled linearly with hydrogen flow rate as predicted by Equation 2, up to the maximum current. The voltage drop across the load resistance also varied linearly with current up to the maximum current. The voltage and current remained constant for increased hydrogen flow rate past the maximum conditions.

The power delivered by the fuel cell to a fixed load can be changed to any value up to the maximum for that load (specified in Table 1) simply by changing the hydrogen flow rate. The power increases quadratically with hydrogen flow rate since $$P_L = i_2^L R_L$$

Figure 4:
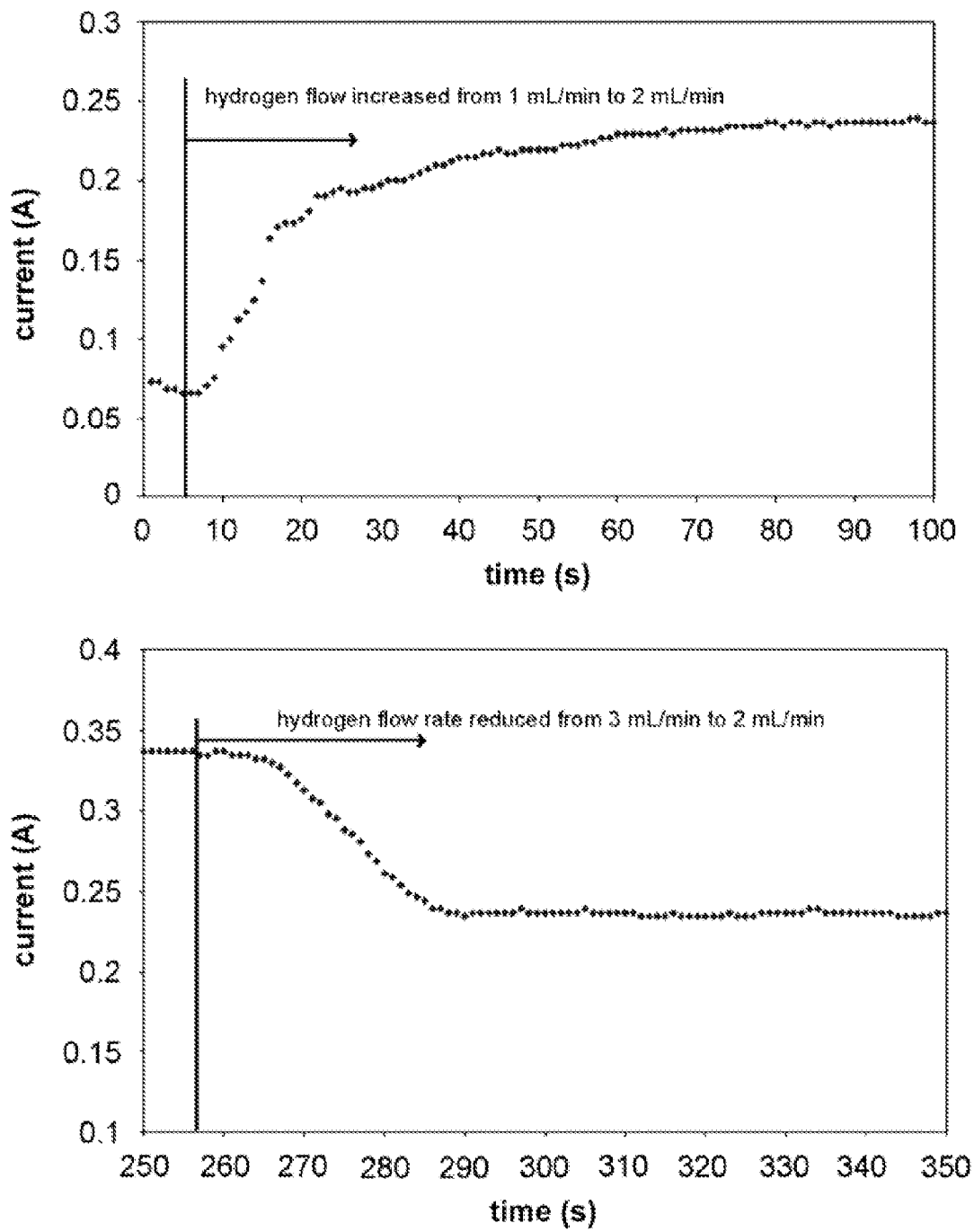
FIG. 4 provides graphical illustration of fuel cell current change in response to a change in fuel flow rate.

Shown in FIG. 4 is the dynamic response of the fuel cell current to step changes in the hydrogen flow rate. For the fuel cell employed in this example the open loop process time constant was ~30 s.

Current regulation was achieved by a balance between the pressure in the cell and the water reservoir where the effluents discharged. Water could flow between the reservoir and the anode flow channel. Changing the water level in the anode flow channel altered the contact area between the gas and the electrode creating a variable internal resistance.

Example 2

Figure 9:
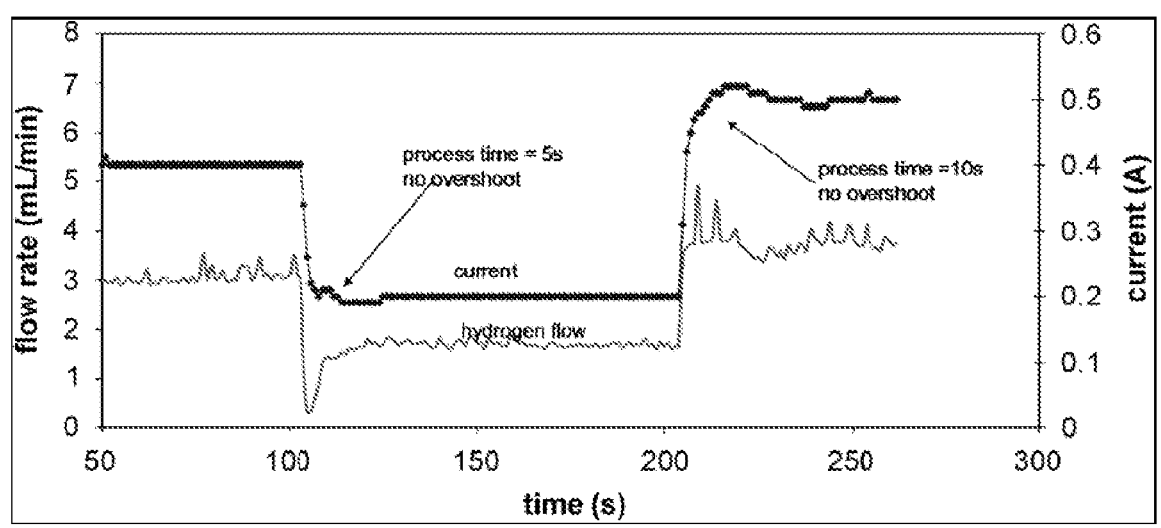
FIG. 9 is a graphical illustration of current regulation by hydrogen feed with complete hydrogen utilization.

The fuel cell response was controlled by employing feedback control on the hydrogen flow rate based on the desired current (or power) setpoint. FIG. 9 is the response to a change in setpoint current when a PID controller was used to regulate the hydrogen flow rate. The load resistance was kept constant at 1Ω, and the oxygen flow was set to a fixed rate of 5 mL/min while the hydrogen flow rate was manipulated to respond in response to the difference in current and the setpoint current. The PID controller was fine tuned from standard Ziegler-Nichols closed loop tuning to achieve a specified current between 100 and 500 mA. The control parameters were as follows:

For hydrogen flow controlled between 0 and 4 mL/min with oxygen flow of 5 mL/min–Gain=1.3; $t_I$=0.4 s; $t_D$=0.07 s.

For oxygen flow controlled between 0 and 2 mL/min with hydrogen flow of 10 mL/min–Gain=6.0; $t_I$=3.0 s; $t_D$=1.2 s.

FIG. 9 shows the current and hydrogen flow rate as a function of time during two setpoint changes in the current at t=100 and 200 s, respectively. The current responds rapidly to changes in the setpoint as the hydrogen flow rate is adjusted by the PID controller, and steady-state is achieved in ~10 s with negligible overshoot. The steady state current shows little fluctuation or variation. The hydrogen flow rate shows non-negligible fluctuations, which may be due to pressure fluctuations at the anode.

TABLE 2

Anode hydrostatic pressure vs. current cell at 25° C., with 1Ω load

| Current (A) | ΔP (cm $H_2O$) |
|---|---|
| 0 | 0 |
| 0.05 | 1.0 |
| 0.1 | 1.2 |
| 0.15 | 1.4 |
| 0.2 | 1.7 |
| 0.3 | 2.5 |
| 0.4 | 3.5 |

Hydrogen utilization was 100% while the fuel cell current was under PID control. This was confirmed by two observations. First, there was no gas exiting the anode once steady state was reached. Second, the hydrogen feed matched the current through the load by the relationship shown in Equation 2 above. With a 1Ω load resistance the current could was controlled between ~50 and ~530 mA. At current setpoints >530 mA and $R_L$=1Ω gas bubbles were observed at the anode outlet and the current reached a maximum of 530 mA.

As discussed above, the fuel cell output was controlled by regulating the hydrogen flow. The fuel cell output is also controllable by regulating the oxygen flow. To illustrate the control of the fuel cell by regulating the oxygen a set-up was used that is similar to that described above in this example.

Figure 8:
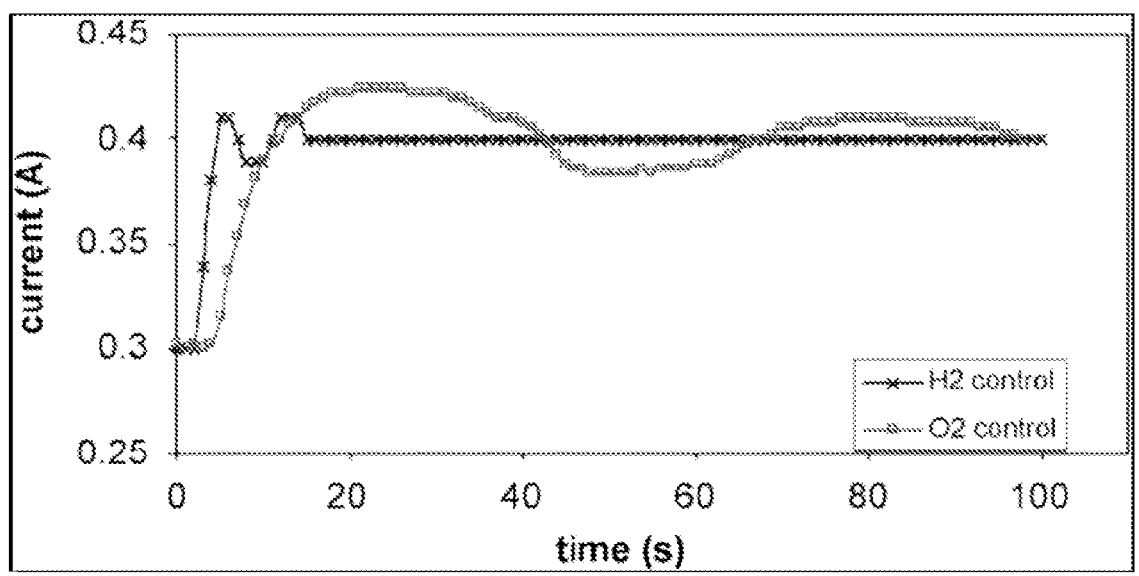
FIG. 8 is a graphical illustration of a comparison of current regulation by hydrogen and by oxygen.

The fuel cell was fed excess hydrogen (10 mL/min) and the oxygen flow was regulated to achieve a desired setpoint current. The PID controller constants were again determined for the fastest response with minimal overshoot The fuel cell operated with 100% oxygen utilization at the cathode and excess hydrogen at the anode. The principal difference between regulating hydrogen or oxygen was that the system took much longer to stabilize under oxygen flow regulation, as illustrated in FIG. 8.

As discussed above, the fuel cell output as controlled by feeding the fuel cell a fixed flow of either excess hydrogen or excess oxygen, while varying the other fed (i.e. either the hydrogen or the oxygen). Additionally, the fuel cell may be controlled using fixed stoichiometric feeds. The difference between the current and the current setpoint was used to manipulate the hydrogen feed rate. The oxygen feed was fixed to be a constant stoichiometry relative to hydrogen. (This is a feedforward control on the oxygen feed and is analogous to a fixed fuel/air mixture to a combustion engine, where the stoichiometry is kept constant and the feed rate is increased or decreased to vary the power.) The PID control parameters determined from the hydrogen flow regulation tests detailed above were employed.

As shown in FIG. 5, the stability of the fuel cell was improved when the stoichiometric ratio of oxygen was increased while the current was regulated by hydrogen feed control. The maximum stability occurred with a stoichiometric ratio of 2:1.3 ($H_2:O_2$).

Figure 6A:
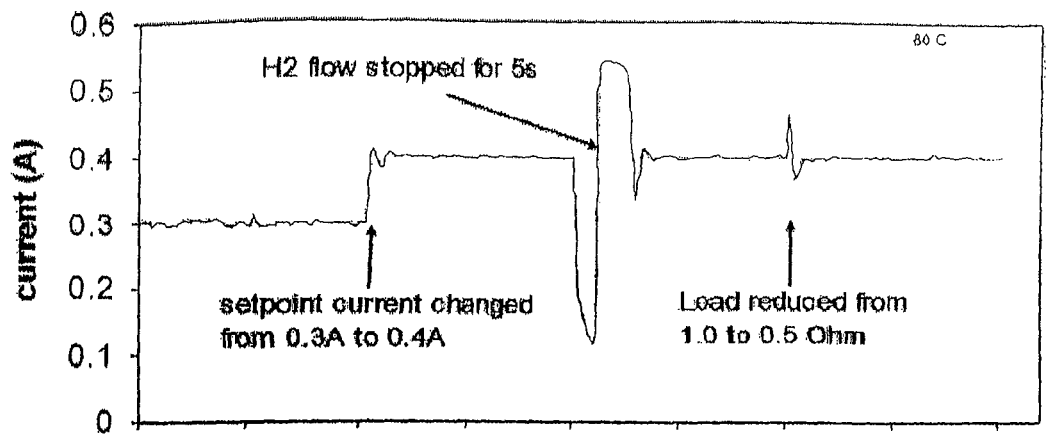
FIG. 6a is a graphical illustration of the response of the fuel cell of FIG. 1 to a change in the setpoint current.
Figure 6B:
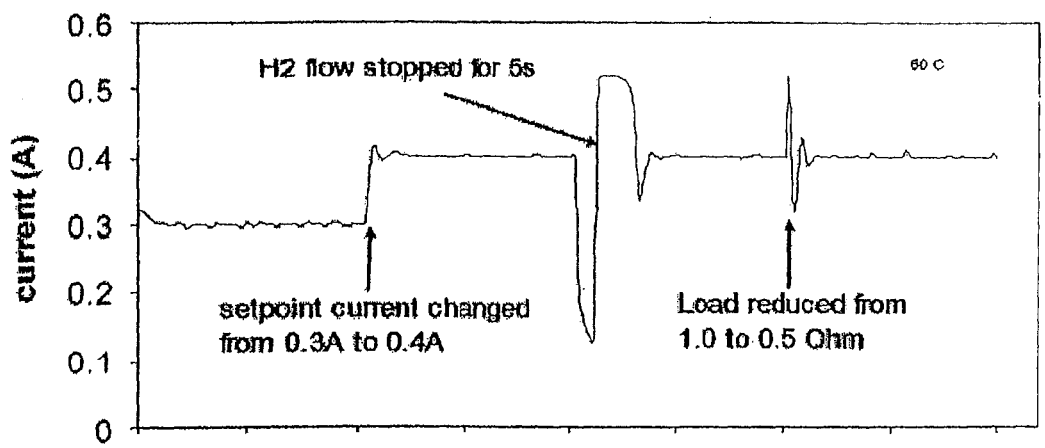
FIG. 6b is a graphical illustration of the response of the fuel cell of FIG. 1 to a disruption in the flow of fuel.
Figure 6C:
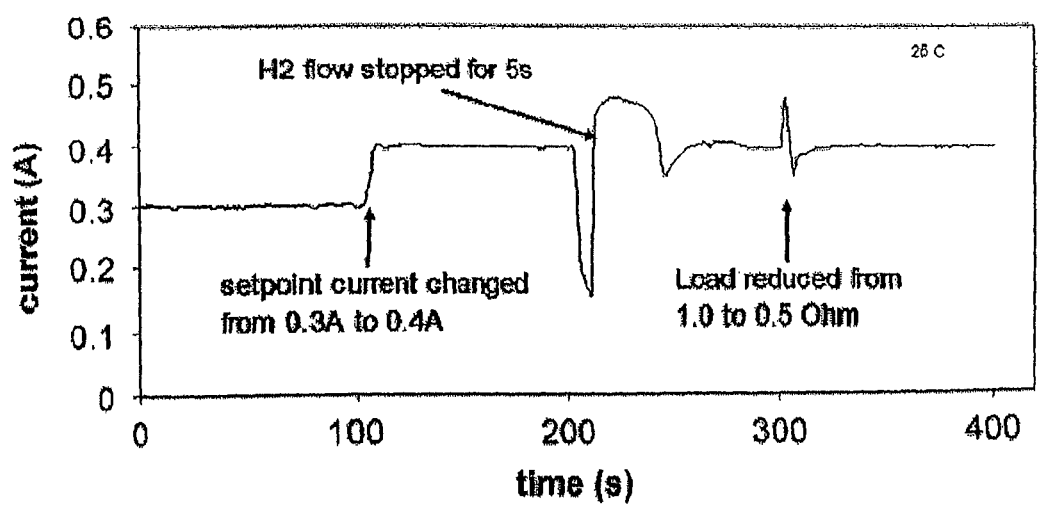
FIG. 6c is a graphical illustration of the response of the fuel cell of FIG. 1 to a change in the load.

The stability of the control and the water balances in the fuel cell were tested over periods of 24-72 h. Current regulation by hydrogen feed control operated stably over periods of 72 h. When operated with 100% hydrogen utilization and 30% oxygen excess, all the water formed in the fuel cell exited in the cathode effluent, as measured by fluid in the fluid reservoirs. The robustness of feedback control for current regulation was tested under different types of disturbances at three different operating temperatures. As shown in FIG. 6a-c, the fuel cell recovered from changes in setpoint and load within seconds at temperatures between 25 and 80 ° C. For a current setpoint change from 300 to 400 mA, the response time was under 10 s at all three temperatures. When $H_2$ flow was stopped for 5 s, the current was able to return to the setpoint value within 32-54 s. The fuel cell took longer to respond to the disruption in hydrogen flow at lower temperatures, possibly due to more liquid water present. After a reduction in load from 1 to 0.5 Ω the current was able to recover within 7-14 s.

Figure 7:
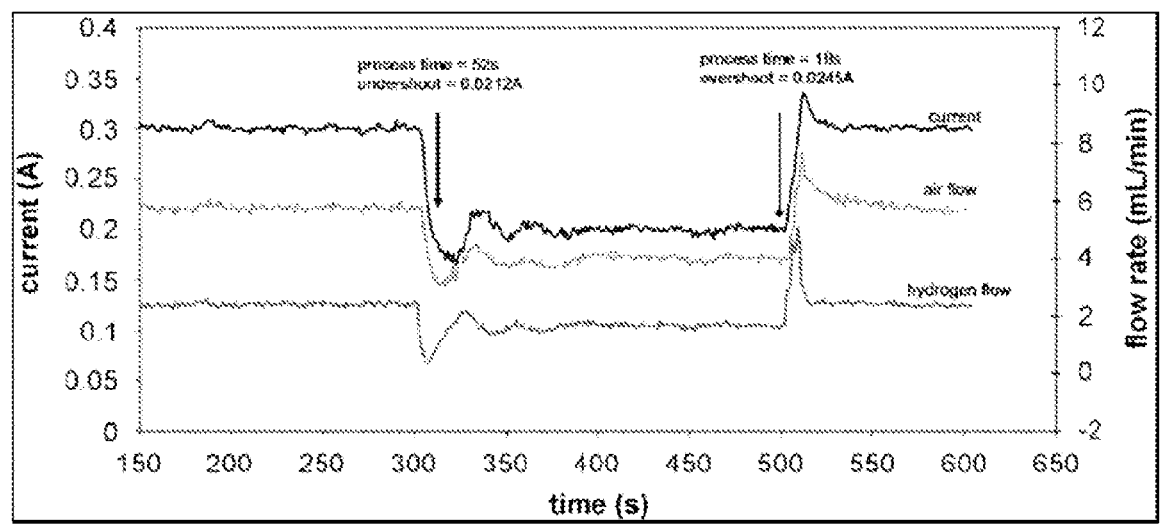
FIG. 7 is a graphical illustration of the response of the fuel cell of FIG. 1 to changes in the setpoint current during control by combined fuel and oxygen starvation.

When the examples were repeated with air feeds, 100% $H_2$ and 100 $O_2$ utilization could be achieved. The current was maintained at a setpoint of 300 mA at 25 ° C. for >4hr with 100% hydrogen utilization and a 2:5 feed ration of hydrogen to air. Furthermore, as shown in FIG. 7, a setpoint change from 300 mA to 200 mA had a recovery time of 52 s whereas the reverse change from 200 mA to 300 mA had a recovery time of 19 s.

It will be recognized by those skilled in the art that changes or modifications may be made to the above-described embodiments without departing from the broad inventive concepts of the invention. For instance, in the foregoing discussion the system has been described as including a single fuel cell. However, it should be appreciated that the fuel cell could readily be incorporated into a stack of fuel cells having a common reservoir for all of the anodes in the stack and a common reservoir for all the cathodes in the stack. Similarly, a common fluid controller could control the flow of fuel to the anodes and a common fluid controller could control the flow of oxygen to the cathodes. It should therefore be understood that this invention is not limited to the particular embodiments described herein, but is intended to include all changes and modifications that are within the scope and spirit of the invention as set forth in the claims.

We claim:

1. A fuel cell operable to provide power to a load having a variable demand, wherein the fuel cell comprises:
   an anode;
   a cathode;
   an electrolyte disposed between the anode and the cathode for conducting protons;
   a first fluid plenum formed adjacent the anode, wherein the first fluid plenum comprises a first inlet for receiving a fuel supply;

a second fluid plenum formed adjacent the cathode, wherein the second fluid plenum comprises an second inlet for receiving an oxygen supply;

a water reservoir for receiving water from the first plenum, wherein the water reservoir is in fluid communication with the first plenum so water can flow from the reservoir back into the first plenum;

a sensor for detecting the demand of the load;

a first fluid controller configured to control the supply of the fuel to the first fluid plenum, wherein the first fluid controller is configured to control the supply of the fuel to create a pressure differential in the first plenum tending to cause water to flow from the water reservoir into the first plenum; and a controller configured to control the first fluid controller in response to the demand of the load detected by the sensor.

2. The fuel cell of claim 1 wherein the electrolyte comprises a proton exchange membrane.

3. The fuel cell of claim 2 wherein the first fluid plenum comprises a first outlet in fluid communication with the first outlet and the reservoir retains a quantity of water that can flow from the reservoir back into the first fluid plenum through the first outlet.

4. The fuel cell of claim 3 wherein the controller is operable to control the fluid controller to maintain a generally constant fluid pressure within the first or second fluid plenum.

5. The fuel cell of claim 2 comprising a first flow plate forming the first plenum, wherein the flow plate comprises:
   a recess having side walls forming the outer side walls of the first fluid plenum; and
   a plurality of columns projecting upwardly within the recess.

6. The fuel cell of claim 2 wherein the fuel supply supplies a dry feed of fuel to the first fluid plenum.

7. The fuel cell of claim 2 wherein the controller is operable to control the fluid controller to supply an amount of fuel to provide substantially full utilization of the fuel in a pass through the fuel cell.

8. The fuel cell of claim 7 wherein the controller is operable to control the fluid controller to provide less than 25% excess of fuel.

9. The fuel cell of claim 7 wherein the controller is operable to control the fluid controller to supply an amount of fuel to provide substantially full utilization of the fuel in a pass through the fuel cell.

10. The fuel cell of claim 1 wherein the first fluid controller is operable to control the supply of the fuel to increase the pressure in the first plenum to reduce the water level in the first plenum, thereby reducing the internal resistance of the fuel cell.

11. The fuel cell of claim 1 wherein the first fluid controller is operable to regulate current produced by the fuel cell by balancing the pressure in the fuel cell and the water reservoir.

12. A fuel cell, comprising:
    an anode comprising a gas diffusion layer and a catalyst;
    a cathode comprising a gas diffusion layer and a catalyst;
    a proton exchange membrane disposed between the anode and the cathode;
    a first self-draining fluid plenum formed adjacent the anode;
    a second self-draining fluid plenum formed adjacent the cathode;
    a fuel supply line in fluid communication with the first fluid plenum;
    an oxygen supply line in fluid communication with the second fluid plenum;
    a fluid reservoir in fluid communication with the first fluid plenum wherein water can flow in and out of the first fluid plenum;
    a fluid controller configured to control the supply of fuel to the first plenum, wherein the first fluid controller is configured to control the supply of the fuel to create a pressure differential in the first plenum tending to cause fluid to flow from the fluid reservoir into the first plenum;
    a controller configured to determine the amount of fuel required based on the desired power output for the fuel cell, wherein the controller is configured to control the fluid controller in response to the required amount of fuel determined.

13. The fuel cell of claim 12 wherein the first fluid plenum comprises an inlet for receiving the fuel from the fuel supply line and an outlet in fluid communication with the fluid reservoir, wherein the outlet is positioned vertically below the inlet.

14. The fuel cell of claim 13 wherein the first fluid plenum is formed such that the plenum is generally open without a wall within the plenum that would substantially impede the free flow of liquid from the inlet to the outlet.

15. The fuel cell of claim 12 wherein the controller is operable to control the fluid controller to provide a generally stoichiometric amount of fuel without providing a substantial excess quantity of fuel.

16. The fuel cell of claim 12 comprising a first flow plate forming the first fluid plenum, wherein the flow plate comprises:
    a recess having side walls forming the outer side walls of the first fluid plenum; and
    a plurality of columns projecting upwardly within the recess into engagement with the anode.

17. The fuel cell of claim 12 wherein the fluid controller is operable to control the supply of the fuel to increase the pressure in the first plenum to reduce the water level in the first plenum.

18. The fuel cell of claim 17 wherein increasing the pressure in the first plenum to reduce the water level in the first plenum reduces the internal resistance of the fuel cell.

19. The fuel cell of claim 12 wherein the fluid controller is operable to regulate current produced by the fuel cell by balancing the pressure in the fuel cell and the water reservoir.

20. A fuel cell operable to provide power to a load having a variable demand, wherein the fuel cell comprises:
    an anode;
    a cathode;
    an electrolyte disposed between the anode and the cathode for conducting protons;
    a first fluid plenum formed adjacent the anode, wherein the first fluid plenum comprises a first inlet for receiving a fuel supply;
    a second fluid plenum formed adjacent the cathode, wherein the second fluid plenum comprises an second inlet for receiving an oxygen supply;
    a water reservoir for receiving water from the second plenum, wherein the water reservoir is in fluid communication with the second plenum so water can flow from the reservoir back into the first plenum;
    a sensor for detecting the demand of the load;
    a fluid controller configured to control the supply of oxygen to the second fluid plenum, wherein the fluid controller is configured to control the supply of the oxygen to create a pressure differential in the second plenum tending to cause water to flow from the water reservoir into the second plenum;; and a controller configured to control the fluid controller in response to the demand of the load detected by the sensor.

21. The fuel cell of claim 20 wherein the electrolyte comprises a proton exchange membrane.

22. The fuel cell of claim 20 wherein the controller is operable to control the fluid controller to maintain a generally constant fluid pressure within the first or second fluid plenum.

23. The fuel cell of claim 20 wherein the fuel supply supplies a dry feed of fuel to the first fluid plenum.

24. The fuel cell of claim 20 wherein the controller is operable to control the fluid controller to supply an amount of oxygen to provide substantially full utilization of the oxygen in a pass through the fuel cell.

25. The fuel cell of claim 24 wherein the controller is operable to control the fluid controller to provide less than 25% excess of oxygen.

26. The fuel cell of claim 20 wherein the fluid controller is operable to control the supply of the fuel to increase the pressure in the second plenum to reduce the water level in the second plenum, thereby reducing the internal resistance of the fuel cell.

27. The fuel cell of claim 20 wherein the fluid controller is operable to regulate current produced by the fuel cell by balancing the pressure in the fuel cell and the water reservoir.

* * * * *